(12) United States Patent
Agrawal

(10) Patent No.: US 7,782,907 B2
(45) Date of Patent: Aug. 24, 2010

(54) DSL MODEMS WITH ANALOG VOICE BAND SUPPORT

(75) Inventor: Kapil Agrawal, Karnataka (IN)

(73) Assignee: Broadcom Corporation, Irvine, CA (US)

( * ) Notice: Subject to any disclaimer, the term of this patent is extended or adjusted under 35 U.S.C. 154(b) by 1016 days.

(21) Appl. No.: 11/520,300

(22) Filed: Sep. 12, 2006

(65) Prior Publication Data

US 2008/0063011 A1 Mar. 13, 2008

(51) Int. Cl.
*H04J 1/02* (2006.01)

(52) U.S. Cl. .................. 370/493; 370/537; 375/222

(58) Field of Classification Search .............. None
See application file for complete search history.

(56) References Cited

U.S. PATENT DOCUMENTS 6,640,239 B1 * 10/2003 Gidwani ................ 709/203
7,050,553 B2 * 5/2006 Chang et al. ........... 379/93.15

OTHER PUBLICATIONS

G.992.1 (G.dmt) Draft Recommendation, Committee T1—Telecommunications, 241 pages, May 1999.*
VDSL Transmission Technology, Committee T1—Telecommunications, 121 pages, Aug. 1999.*

* cited by examiner

*Primary Examiner*—Frank Duong
(74) *Attorney, Agent, or Firm*—Farjami & Farjami LLP

(57) ABSTRACT

There is provided a DSL modem for integrating an analog voice band with DSL bands over a telephone line, where the analog voice band consists of 0-4 kHz frequency range, and the DSL bands consist of frequencies beyond 4 kHz. The DSL modem comprises a splitter configured to receive a telephone line signal from the telephone line and split the telephone line signal into an analog voice band signal and a DSL bands signal; a voice module configured to receive the analog voice band signal, digitize the analog voice band signal to generate digitized voice band signal and packetize digitized voice band signal into packetized voice band signal; a DSL module configured to receive the DSL bands signal and retrieve packetized DSL bands signal from DSL bands signal; and a multiplexer configured to multiplex packetized voice band signal and packetized DSL bands signal to generate multiplexed voice-DSL packets.

20 Claims, 5 Drawing Sheets

DSL MODEMS WITH ANALOG VOICE BAND SUPPORT

BACKGROUND OF THE INVENTION

1. Field of the Invention

The present invention relates generally to data and voice communications. More particularly, the present invention relates to DSL modems.

2. Background Art

Over the last several years, DSL (Digital Subscriber Line) service has experienced ever-increasing demand from the subscriber community. In addition, the need to support higher-bandwidth solutions such as on-demand video services has driven the need for the DSL technology to even a higher level of demand.

By way of introduction, DSL technology is a copper loop transmission technology that converts existing copper telephone wire into a high-speed data highway with broadband speeds. xDSL is a generic name for the various versions of DSL technologies, such as ADSL (Asymmetric DSL), HDSL (High bit-rate DSL), RADSL (Rate Adaptive DSL), etc. DSL technology achieves broadband speeds over the ordinary phone wire. Although traditional analog telephone conversations, faxes and modem transmissions are limited to a 3,400 hz analog voice channel with a maximum possible modem speed of 56 kbps, DSL transmits a broader range of frequencies over existing copper telephone wire to achieve speeds over 30 times faster than a 56k modem. This significant increase in speed is possible because DSL uses a dedicated secure copper wire circuit that does not go through analog telephone switching equipment and because digital data (not an analog signal) is being transmitted.

Traditional phone service, namely "Plain Old Telephone Service" or "POTS" connects a home or small business to a telephone company office over copper wires that are wound around each other and called twisted pair. Regular voice signals travel over phone lines at frequencies ranging from 0 kHz to 4 kHz. Standard modems or analog modems use the same range of frequencies as voice, and communicate data in analog form over phone lines.

In contrast, DSL uses frequencies between 25 kHz and 1 MHz. DSL is a technology that assumes digital data does not require change into analog form and back. Digital data is transmitted to a host computer directly as digital data and this allows the phone company to use a much wider bandwidth for transmitting data to the host computer. Meanwhile, the telephone signal can be separated into voice band frequencies of 0-4 kHz and DSL bands frequencies of higher than 4 kHz using a filter that is typically referred to as a splitter, so that the voice band may still be used to transmit an analog signal concurrently with using DSL bands.

FIG. 1 illustrates conventional DSL system 100 for installation at homes or offices. As shown, DSL system 100 includes splitter 105 that receives telephone line signal 102. Splitter 105 is a filter that splits telephone line signal 102 into voice band signal 107 that carries frequencies of 0-4 kHz and DSL bands signal 109 that carries DSL bands frequencies of higher than 4 kHz. As further shown in FIG. 1, voice band signal 107 is communicated between splitter 105 and telephone 115, and DSL bands signal 109 is communicated between splitter 105 and DSL modem 110.

A great drawback of conventional DSL system 100 is that it fails to integrate analog voice and DSL communications, so that it can support analog voice and DSL communications in a single device. Rather, conventional DSL system 100 requires the user to use telephone 115 in addition to computer 120 for answering incoming calls via voice band 107.

A solution that present systems offer for having a fully integrated telephone usage from computer 120 is to include a VoIP (Voice over Internet Protocol) phone system in computer 120. In other words, in addition to data, voice communication is also supported through DSL bands 109. However, such solution requires expensive infrastructures, such as routers, cabling, VoIP phone equipment, VoIP-enabled APBX, etc., which are not economical for home and small office applications that already have conventional telephone equipment that utilize regular phone lines.

Accordingly, there is a need to overcome the drawbacks and deficiencies in the art by providing methods and systems that can offer more affordable and less complicated alternatives to conventional solutions for integrating analog voice communications and DSL modems.

SUMMARY OF THE INVENTION

There are provided systems and methods for providing DSL modems with analog voice band support, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

Figure 1:
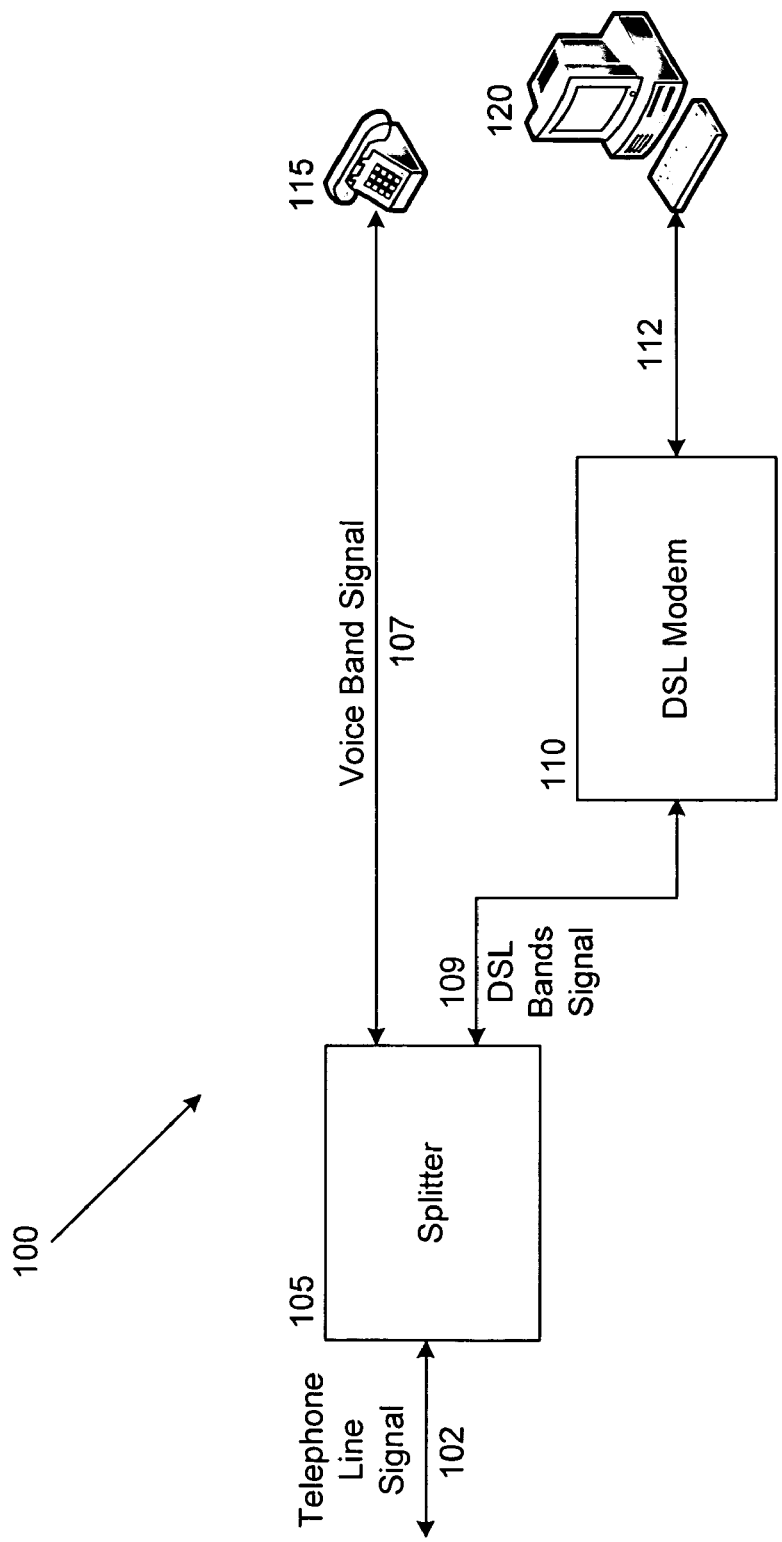
FIG. 1 is a block diagram illustrating a conventional DSL system.

Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art.

The drawings in the present application and their accompanying detailed description are directed to merely example embodiments of the invention. To maintain brevity, other embodiments of the invention which use the principles of the present invention are not specifically described in the present application and are not specifically illustrated by the present drawings. It should be borne in mind that, unless noted otherwise, like or corresponding elements among the figures may be indicated by like or corresponding reference numerals.

Figure 2:
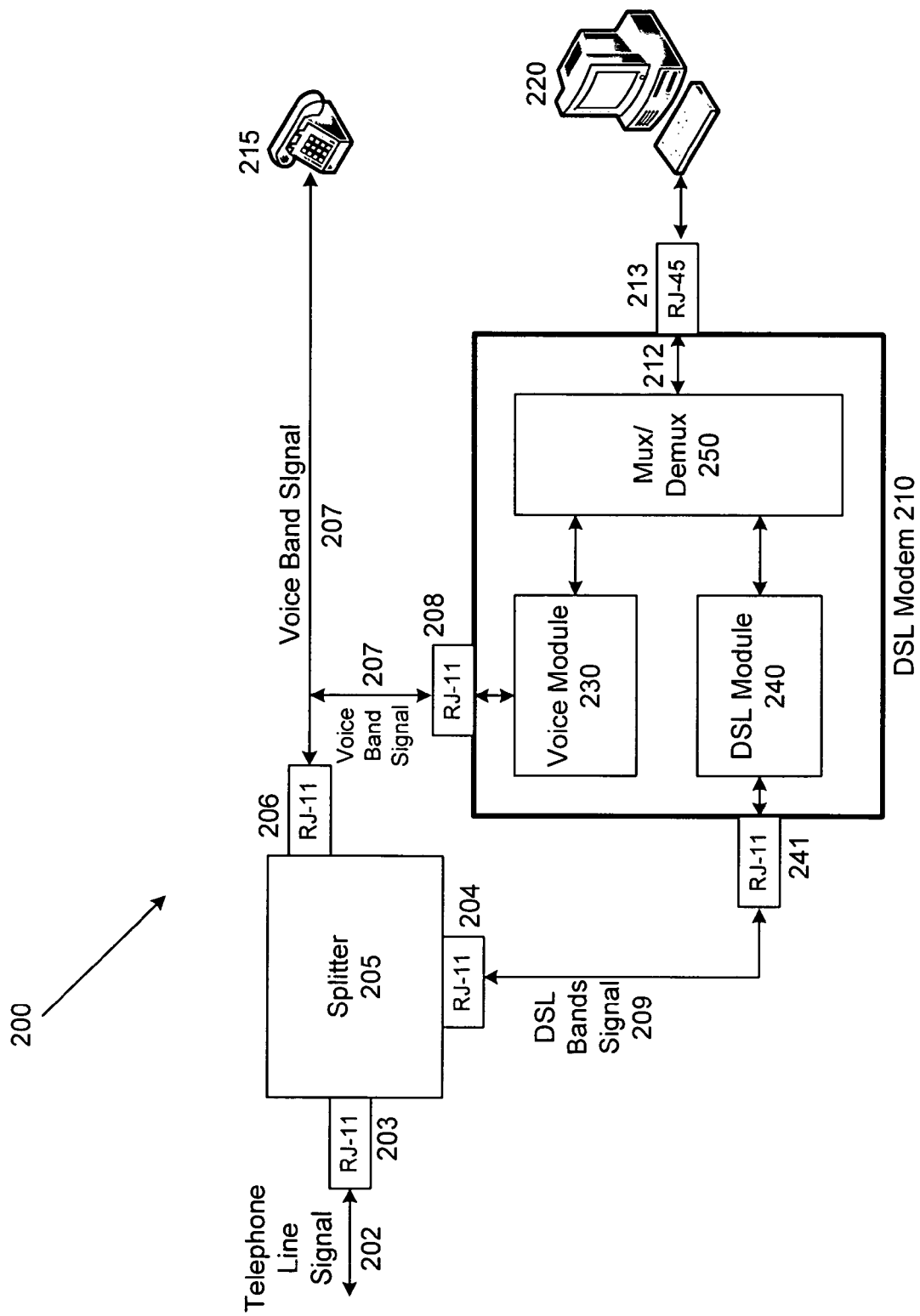
FIG. 2 is a block diagram illustrating a DSL system, according to one embodiment of the present invention.

FIG. 2 is a block diagram illustrating DSL system 200, according to one embodiment of the present invention. In the embodiment of FIG. 2, splitter 205 is a filter located outside of DSL modem 210 for splitting telephone line signal 202 into voice band signal 207 that carries frequencies of 0-4 kHz and DSL bands signal 209 that carries DSL bands frequencies of higher than 4 kHz. As further shown in FIG. 2, voice band signal 207 is communicated between splitter 205 and telephone 215, and DSL bands signal 209 is communicated between splitter 205 and DSL modem 210. Also, voice band signal 207 is communicated between splitter 205 and voice module 230 of DSL modem 210. In operation, splitter 205 receives telephone line signal 202 over the twisted pair of copper wires (not shown) from the Central Office (CO) via RJ-11 connection 203 or phone line jack. After splitting telephone line signal 202 into voice band signal 207 and DSL bands signal 209, voice band signal 207 is communicated to telephone 215 via RJ-11 connection 206 and DSL bands signal 209 is communicated to DSL modem 210 via RJ-11 connection 204 and RJ-11 connection 241. In contrast to conventional DSL systems, voice band signal 207 is also communicated to DSL modem 210 via RJ-11 connection 204 and RJ-11 connection 208.

As shown in FIG. 2, DSL modem 210 includes voice module 230, DSL module 240 and multiplexer/demultiplexer 250. DSL module 240 operates similar to conventional DSL modem 110 for processing DSL bands signal 209 to retrieve the data embedded in DSL bands signal 209, e.g. data packetized according to Internet Protocol (IP) format, and to send the IP DSL data packets to multiplexer/demultiplexer 250. Voice module 230 also receives voice band signal 207 and digitizes voice band signal 207 using a codec or analog-to-digital converter (not shown) to generate digital samples of voice band signal 207. Voice module 230 then packetizes digital samples of voice band signal 207 using the IP format and transmits IP voice packets to multiplexer/demultiplexer 250. Multiplexer/demultiplexer 250 multiplexes IP DSL data packets and IP voice packets and sends multiplexed IP voice-DSL packets to host or computer 220 over communication line 212 via RJ-45 connection 213 or computer line jack. Computer 220 includes application software or hardware modules (not shown) that can demultiplex IP voice-DSL packets to separate IP voice packets and IP DSL data packets. Computer 220 is also capable of processing the IP voice packets to extract caller identification information from the IP voice packets, as known in the art, and further convert the IP voice packets to an analog voice signal using a codec or digital-to-analog converter (not shown) for playing by a speaker. According to this embodiment, computer 220 may alert the user about the incoming call and/or display the caller identification number of the incoming call and determine whether the user would like to answer or reject the incoming call. For example, computer 220 may include a look-up table including caller identification numbers, names, photos, etc., such that when the caller identification number is extracted from the voice signal, it can be displayed on the screen in a pop-up window. Further, if the user is unavailable or rejects the incoming call, computer 220 may function as an answering machine and record a message. Generally, computer 220 may also function as a recording device and record voice communications in the voice band. The incoming call may be answered by telephone 215, or voice module 230 may include additional data access arrangement (DAA) circuitry for answering the incoming call by taking the telephone line off-hook.

If the incoming call is answered, computer 220 also receives user's analog voice signal via a computer microphone and digitizes user's analog voice signal using a codec or analog-to-digital converter (not shown) to generate digital samples of user's analog voice signal. Computer 220 then packetizes digital samples of user's analog voice signal using the IP format and multiplexes IP voice packets with user's IP DSL data packets and sends multiplexed IP voice-DSL packets to DSL modem 210 over communication line 212 via RJ-45 connection 213. Multiplexer/demultiplexer 250 of DSL modem 210 receives the multiplexed IP voice-DSL packets over communication line 212 and demultiplexes IP voice-DSL packets to separate IP voice packets and IP DSL data packets. Multiplexer/demultiplexer 250 then routs IP voice packets to voice modules 230 and routs IP DSL data packets to DSL module 240 for further processing. Next, voice module 230 depacketizes IP voice packets to obtain digitized voice samples and converts the digitized voice samples to an analog voice signal using a codec or digital-to-analog converter (not shown) for transmission over telephone line signal 202 through voice band signal 207 via RJ-11 connection 208 and RJ-11 connection 206. Also, DSL module 240 processes data within the IP DSL data packets similar to conventional DSL modem 110 and transmits the DSL data over telephone line signal 202 through DSL bands signal 209 via RJ-11 connection 241 and RJ-11 connection 204.

Figure 3:
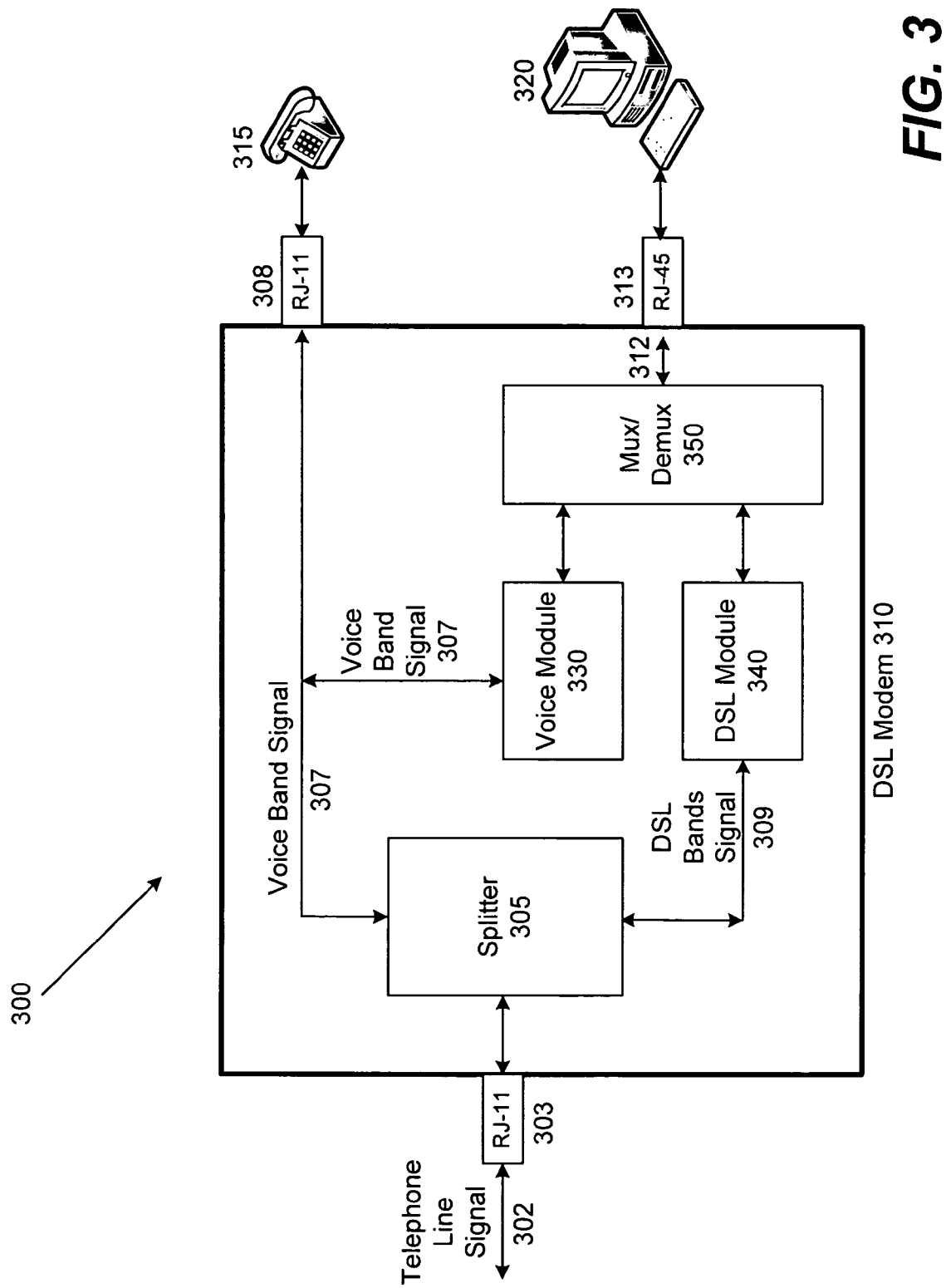
FIG. 3 is a block diagram illustrating a DSL system, according to another embodiment of the present invention.

Turning to FIG. 3, a block diagram of DSL system 300 is illustrated, according to another embodiment of the present invention. In the embodiment of FIG. 3, splitter 305 is a filter located inside of DSL modem 310 for splitting telephone line signal 302 into voice band signal 307 that carries frequencies of 0-4 kHz and DSL bands signal 309 that carries DSL bands frequencies of higher than 4 kHz. As further shown in FIG. 3, voice band signal 307 is communicated between splitter 305 and telephone 315, and DSL bands signal 309 is communicated between splitter 305 and DSL module 340. Also, voice band signal 307 is communicated between splitter 305 and voice module 330.

Figure 4:
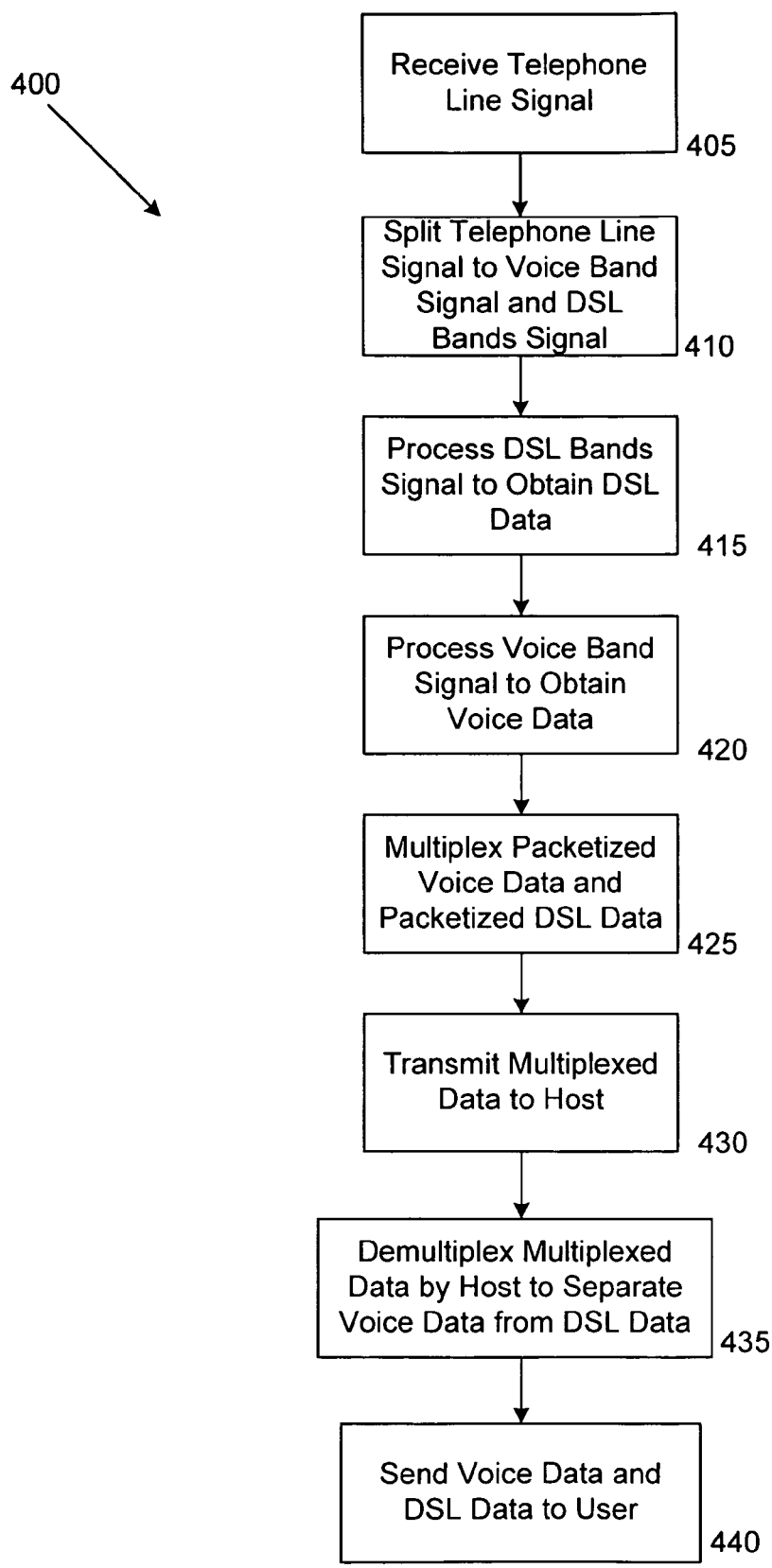
FIG. 4 is a flow diagram illustrating an analog voice and DSL communication method for processing information received from the telephone, according to one embodiment of the present invention.

The operation of DSL modem 310 is now described in conjunction with FIG. 4, which illustrates communication method 400 for communicating information by DSL modem 310 to computer 320, according to one embodiment of the present invention. At step 405, DSL modem 310 receives telephone line signal 302 over the twisted pair of copper wires (not shown) from the CO via RJ-11 connection 303. At step 410, splitter 305 receives telephone line signal 302 and splits telephone line signal 302 into voice band signal 307 and DSL bands signal 309, where voice band signal 307 is communicated to telephone 315 via RJ-11 connection 308 and to voice module 330. Next, at step 415, DSL module 340 operates similar to conventional DSL modem 110 and processes DSL bands signal 309 to retrieve the data embedded in DSL bands signal 309, e.g. data packetized according to Internet Protocol (IP) format, and to send the IP DSL data packets to multiplexer/demultiplexer 350.

At step 420, voice module 330 receives voice band signal 307 and digitizes voice band signal 307 using a codec or analog-to-digital converter (not shown) to generate digital samples of voice band signal 307. Voice module 330 then packetizes digital samples of voice band signal 307 using the IP format and transmits IP voice packets to multiplexer/demultiplexer 350. At this point, in step 425, multiplexer/demultiplexer 350 multiplexes IP DSL data packets and IP voice packets. Next, at step 430, multiplexer/demultiplexer 350 sends multiplexed IP voice-DSL packets to host or computer 320 over communication line 312 via RJ-45 connection 313. At step 435, computer 320 demultiplexes IP voice-DSL packets to separate IP voice packets and IP DSL data packets. In one embodiment, computer 220 processes the IP voice packets and extracts caller identification information from the IP voice packets, as known in the art. Further, at step 440, computer 320 converts the IP voice packets to an analog voice signal using a codec or digital-to-analog converter (not shown) for playing by a speaker. For example, computer 320 may alert the user about the incoming call and/or display the caller identification number of the incoming call to determine whether the user would like to answer or reject the incoming call. Also, computer 320 may include a look-up table including caller identification numbers, names, photos, etc., such that when the caller identification is extracted from the voice signal, it can be displayed on the screen in a pop-up window. Further, if the user is unavailable or rejects the incoming call, computer 320 may function as an answering machine and record a message. Generally, computer 320 may also function as a recording device and record voice communications in the voice band. The incoming call may be answered by telephone 315, or voice module 330 may include additional data access arrangement (DAA) circuitry for answering the incoming call by taking the telephone line off-hook.

Figure 5:
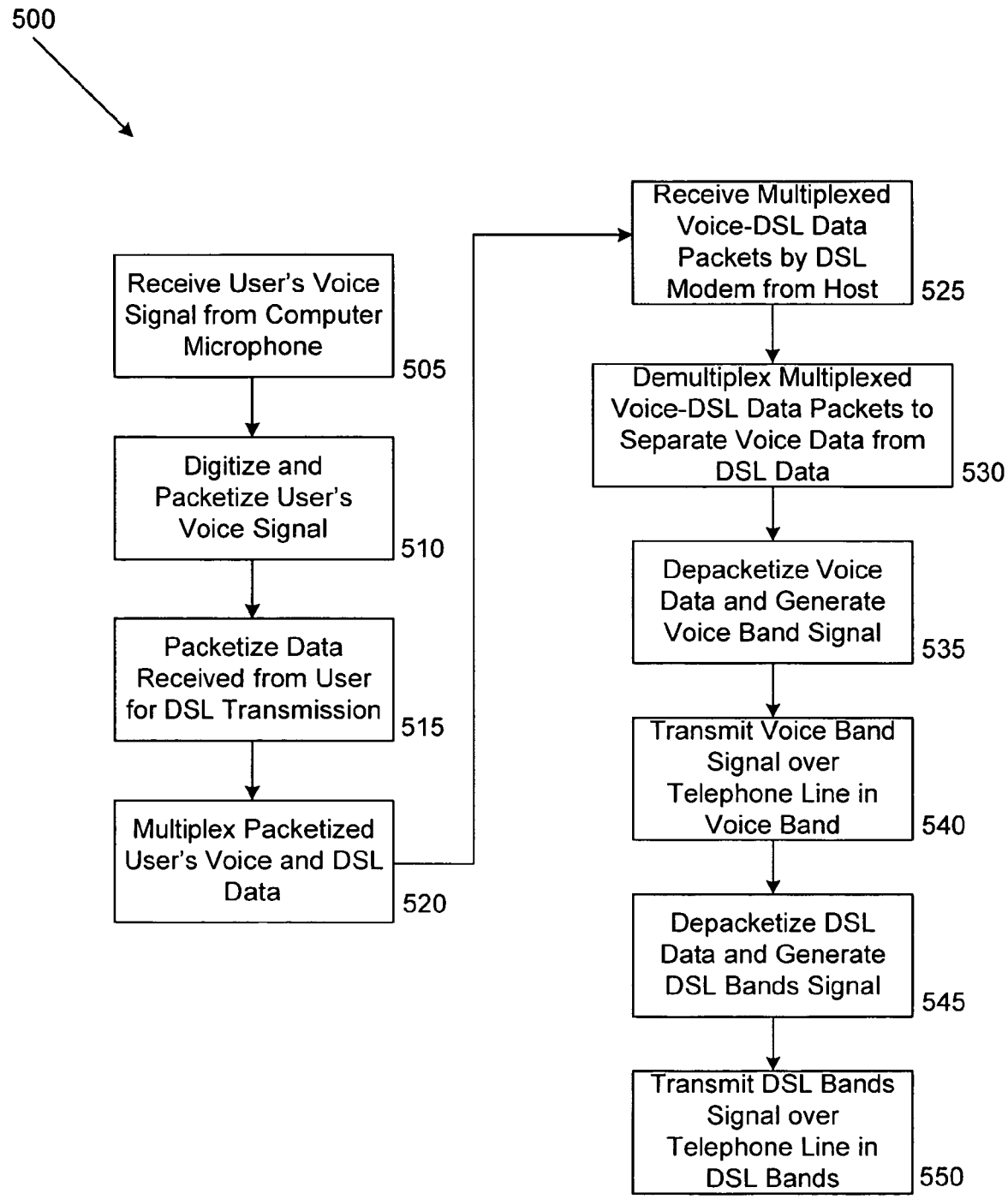
FIG. 5 is a flow diagram illustrating an analog voice and DSL communication method for processing information to be transmitted over the telephone, according to one embodiment of the present invention.

Now, turning to FIG. 5, it illustrates communication method 500 for communicating information from computer 320 to DSL modem 310, and processing by DSL modem 310, according to one embodiment of the present invention. If computer 320 answers the incoming call, at step 505, computer 320 receives user's analog voice signal via a computer microphone and, at step 510, computer 320 digitizes user's analog voice signal using a codec or analog-to-digital converter (not shown) to generate digital samples of user's analog voice signal. Next, at step 515, computer 320 packetizes digital samples of user's analog voice signal using the IP format. At step 520, computer 320 multiplexes IP voice packets with user's IP DSL data packets and sends multiplexed IP voice-DSL packets to DSL modem 310 over communication line 312 via RJ-45 connection 313. At step 525, multiplexer/demultiplexer 350 of DSL modem 310 receives the multiplexed IP voice-DSL packets over communication line 312 and, at step 530, demultiplexes IP voice-DSL packets to separate IP voice packets and IP DSL data packets and routs IP voice packets to voice modules 330 and IP DSL data packets to DSL module 340 for further processing. At step 535, voice module 330 depacketizes IP voice packets to obtain digitized voice samples and converts the digitized voice samples to an analog voice signal using a codec or digital-to-analog converter (not shown) for transmission over telephone line signal 302 through voice band signal 307 via RJ-11 connection 303, at step 540. Also, at step 545, DSL module 340 processes data within the IP DSL data packets similar to conventional DSL modem 110 and, at step 550, transmits the DSL data over telephone line signal 302 through DSL bands signal 309 via RJ-11 connection 303.

Thus, various embodiments of the present invention, as described above, can integrate analog voice communications and DSL modems, and offer many advantages and applications. For example, in a small office environment, an insurance agent may receive analog voice calls via its broadband DSL modem and obtain caller identification information to access internal or online database based on caller identification information to provide faster quotes and improve customer service. Similarly, stock broker terminals may receive analog voice calls via their broadband DSL modems and obtain caller identification information to access customer records based on caller identification information for stock transactions. Also, an application for the integrated analog voice line and DSL modems may be found in the medical industry, where a nurse help line may receive analog voice calls via a broadband DSL modem and obtain caller identification information to access patient's records based on caller identification information to provide medical assistance.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. For example, it is contemplated that the circuitry disclosed herein can be implemented in software, or vice versa. The described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A DSL system for integrating an analog voice band with DSL bands over a telephone line, the DSL system comprising:
  a splitter configured to receive a telephone line signal from the telephone line and split the telephone line signal into an analog voice band signal and a DSL bands signal; and
  a DSL modem including:
    a voice module configured to receive the analog voice band signal, digitize the analog voice band signal to generate digitized voice band signal and packetize digitized voice band signal into packetized voice band signal;
    a DSL module configured to receive the DSL bands signal and retrieve packetized DSL bands signal from DSL bands signal; and
    a multiplexer configured to multiplex packetized voice band signal and packetized DSL bands signal to generate multiplexed voice-DSL packets.

2. The DSL system of claim 1, wherein the DSL modem further comprises:
  a first phone line jack configured to receive the analog voice band signal from the splitter and communication the analog voice band signal to the voice module;
  a second phone line jack configured to receive the DSL bands signal from the splitter and communication the DSL bands signal to the DSL module; and
  a computer line jack configured to receive the multiplexed voice-DSL packets from the multiplexer and communication the multiplexed voice-DSL packets to a computer.

3. The DSL system of claim 1, wherein the analog voice band consists of 0-4 kHz frequency range, and the DSL bands consist of frequencies beyond 4 kHz.

4. The DSL system of claim 1, wherein the DSL modem further comprises:
  a demultiplexer configured to demultiplex multiplexed voice-DSL computer packets received from a computer over a computer line jack to generate packetized computer voice band signal and packetized computer DSL bands signal.

5. The DSL system of claim 4, wherein the voice module is configured to receive packetized computer voice band signal, depacketize packetized computer voice band signal to generate digitized computer voice band signal, and convert digitized computer voice band signal into computer analog voice band signal for transmission over the telephone line.

6. The DSL system of claim 5, wherein the DSL module is configured to receive the packetized computer DSL bands signal and transmit the packetized computer DSL bands signal over the telephone line.

7. A DSL modem for integrating an analog voice band with DSL bands over a telephone line, the DSL modem comprising:
a splitter configured to receive a telephone line signal from the telephone line and split the telephone line signal into an analog voice band signal and a DSL bands signal;
a voice module configured to receive the analog voice band signal, digitize the analog voice band signal to generate digitized voice band signal and packetize digitized voice band signal into packetized voice band signal;
a DSL module configured to receive the DSL bands signal and retrieve packetized DSL bands signal from DSL bands signal; and
a multiplexer configured to multiplex packetized voice band signal and packetized DSL bands signal to generate multiplexed voice-DSL packets.

8. The DSL modem of claim 7 further comprising:
a phone line jack configured to receive the telephone line signal from the telephone line and communication the telephone line signal to the splitter;
a computer line jack configured to receive the multiplexed voice-DSL packets from the multiplexer and communication the multiplexed voice-DSL packets to a computer.

9. The DSL modem of claim 7, wherein the analog voice band consists of 0-4 kHz frequency range, and the DSL bands consist of frequencies beyond 4 kHz.

10. The DSL modem of claim 7 further comprising:
a demultiplexer configured to demultiplex multiplexed voice-DSL computer packets received from a computer over a computer line jack to generate packetized computer voice band signal and packetized computer DSL bands signal.

11. The DSL modem of claim 10, wherein the voice module is configured to receive packetized computer voice band signal, depacketize packetized computer voice band signal to generate digitized computer voice band signal, and convert digitized computer voice band signal into computer analog voice band signal for transmission over the telephone line.

12. The DSL modem of claim 11, wherein the DSL module is configured to receive the packetized computer DSL bands signal and transmit the packetized computer DSL bands signal over the telephone line.

13. A method of integrating an analog voice band with DSL bands over a telephone line for use by a DSL modem, the method comprising:
receiving a telephone line signal from the telephone line;
splitting the telephone line signal into an analog voice band signal and a DSL bands signal;
receiving the analog voice band signal by a voice module of the DSL modem;
digitizing the analog voice band signal by the voice module to generate digitized voice band signal;
packetizing digitized voice band signal by the voice module to generate packetized voice band signal;
receiving the DSL bands signal by a DSL module of the DSL modem and retrieving packetized DSL bands signal from DSL bands signal; and
multiplexing packetized voice band signal and packetized DSL bands signal by a multiplexer of the DSL modem to generate multiplexed voice-DSL packets.

14. The method of claim 13, wherein the splitting is performed by a splitter inside of the DSL modem.

15. The method of claim 14, wherein the receiving the telephone line signal from the telephone line is performed by a phone line jack of the DSL modem that communicates the telephone line signal to the splitter, and wherein a computer line jack of the DSL modem communicates the multiplexed voice-DSL packets from the multiplexer to a computer.

16. The method of claim 13, wherein the splitting is performed by a splitter outside of the DSL modem.

17. The method of claim 16, wherein the receiving the telephone line signal from the telephone line is performed by the splitter, and the receiving the analog voice band signal is performed by a first telephone jack of the DSL modem that communicates the analog voice band signal to the voice module of the DSL modem, wherein the receiving the DSL bands signal is performed by a second telephone jack of the DSL modem that communicates the DSL bands signal to the DSL module of the DSL modem, and wherein a computer line jack of the DSL modem communicates the multiplexed voice-DSL packets from the multiplexer to a computer.

18. The method of claim 13, wherein the analog voice band consists of 0-4 kHz frequency range, and the DSL bands consist of frequencies beyond 4 kHz.

19. The method of claim 13 further comprising:
demultiplexing multiplexed voice-DSL computer packets received from a computer over a computer line jack by a demultiplexer to generate packetized computer voice band signal and packetized computer DSL bands signal.

20. The method of claim 19 further comprising:
receiving packetized computer voice band signal by the voice module;
depacketizing packetized computer voice band signal by the voice module to generate digitized computer voice band signal;
converting digitized computer voice band signal into computer analog voice band signal by the voice module for transmission over the telephone line;
receiving the packetized computer DSL bands signal by the DSL module; and
transmitting the packetized computer DSL bands signal by the DSL module over the telephone line.

* * * * *